United States Patent [19]

Jackson

[11] Patent Number: 4,934,489
[45] Date of Patent: Jun. 19, 1990

[54] TANDEM TIRE BRAKE

[76] Inventor: Carl E. Jackson, 1019-6th St., Perry, Okla. 73077

[21] Appl. No.: 323,700

[22] Filed: Mar. 15, 1989

[51] Int. Cl.⁵ .............................................. B60T 1/04
[52] U.S. Cl. ..................... 188/2 R; 70/226; 188/32; 188/36; 188/74
[58] Field of Search ............... 188/4 R, 2 R, 265, 74, 188/32, 29, 52, 53, 54, 55, 56, 68, 73.1, ; 70/225, 226, 228, 212; 410/30; 212/212

[56] References Cited

U.S. PATENT DOCUMENTS

| | | | |
|---|---|---|---|
| 433,413 | 7/1890 | Lawrence | 188/54 |
| 2,772,596 | 12/1956 | Trussell | 188/196 V |
| 3,059,728 | 10/1962 | McKuskie | 188/2 R |
| 3,548,975 | 12/1970 | Herndon | 188/2 R |
| 3,712,424 | 1/1973 | Swan | 188/2 R |
| 3,760,906 | 9/1973 | McGee | 188/2 R X |
| 4,148,378 | 4/1979 | Alford | 188/32 |
| 4,694,936 | 9/1987 | Jackson | 188/2 R |
| 4,715,480 | 12/1987 | Anderson | 188/74 |
| 4,828,076 | 5/1989 | Fox | 188/32 |

Primary Examiner—Andres Kashnikow
Assistant Examiner—Matthew L. Graham
Attorney, Agent, or Firm—Robert K. Rhea

[57] ABSTRACT

An auxiliary locking brake for tandem tires is formed by upper and lower wedge members centrally joined by a threaded shaft moving the wedge members toward and away from each other for impinging confronting thread surfaces of tandem tires when disposed therebetween. Telescoping members adjustably extending between panels forming the wedge members permit fore and aft adjustment of the spacing between the wedge forming panels prior to installation of the locking device on the tires of a particular vehicle. Tire retaining flanges on the wedge members prevent lateral movement of the device in a direction parallel with the axes of tandem axles.

1 Claim, 2 Drawing Sheets

TANDEM TIRE BRAKE

BACKGROUND OF THE INVENTION

1. Field of the Invention

The present invention relates to tandem axle vehicles and more particularly to an exterior tire/wheel locking brake for tandem tires.

Many vehicles, such as trucks, tractor trailer trucks and recreation vehicles, are equipped with tandem axles with the tires on either side of the vehicle on such axles disposed in tandem relation with a circumferential portion of the respective forward and rearward tire in relatively close spaced relation. The spacing between the tire may vary from two to twelve inches on different vehicles. Such vehicles are frequently parked for extended periods of time and it is desirable to provide an auxiliary manner of securing such vehicles and/or the tires and wheels thereof against movement of the vehicle and against theft.

This invention provides such a device.

2. Description of the Prior Art

The most pertinent patent is believed to be my U.S. Pat. No. 4,694,936. This patent discloses a pair of oppositely disposed wedge members moved toward and away from each other by rotating a central control shaft which draws the converging edges of the respective wedge toward the opposite wedge when the device is vertically disposed between the closest portion of the confronting surfaces of tandem tires. This impinges the tire tread surfaces against movement relative to the wedges.

The principal difference between this invention and the above named patent is telescoping members interposed between opposite tire gripping wedge forming panels permitting expanding or retracting the front-to-rear wedge dimension of the wedges of this device for use with a wider range of tandem tire spacing.

SUMMARY OF THE INVENTION

This brake device is formed by upper and lower wedge-shaped members, when viewed in side relation wherein the planes of opposing panels on each wedge converge toward the opposite wedge, the wedges being joined in vertical spaced relation by a threaded control shaft angularly rotated to move the wedges toward and away from each other. In addition to the converging panels each wedge includes telescoping tubular members extending horizontally between and secured to confronting surfaces of each panel. The walls of the telescoping members are apertured for receiving bolts maintaining the telescoping members in a selected expanded or telescoped position. The threaded control shaft is angularly rotated by a ratchet wrench, or the like, with one end portion of the shaft rotating within the upper telescoping members and secured thereto by a washer rotating with the shaft while a threaded nut, fixed to one of the lower telescoping members, move the lower wedge assembly toward and away from the upper wedge assembly. Additionally, a lock tab, fixed on and rotating with the control shaft, mates and mismates with a fixed locking lug for receiving a padlock and preventing angular rotation of the control shaft. Further, fixed position flange-like flaps secured to lateral edge portions of the respective panel forming the wedges prevent lateral movement of the wedge assemblies in a direction parallel with the longitudinal axis of tandem axles.

The principal object of this invention is to provide an improved external brake assembly for tandem tires which may be quickly and easily installed and removed and is readily adjustable for securing a wide variety of tandem tires on a like variety of different vehicles.

DESCRIPTION OF THE PREFERRED EMBODIMENTS

Figure 1:
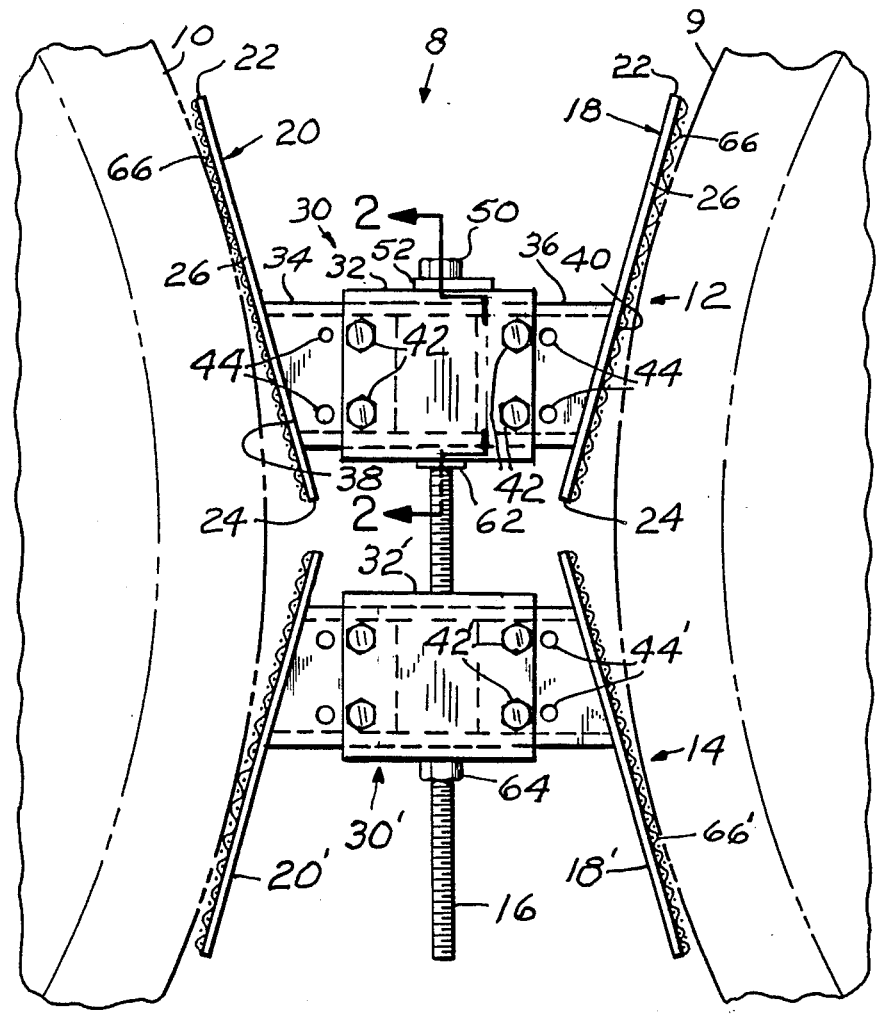
FIG. 1 is a side elevational view of the device in tire locking position between a fragment of tandem tires, the latter being shown by phantom lines.

Like characters of reference designate like parts in those figures of the drawings in which they occur.

In the drawings:

The reference numeral 8 indicates the device, as a whole, comprising upper and lower wedge assemblies 12 and 14 interposed between tires 9 and 10 and joined in cooperative relation by a threaded shaft 16 extending centrally through the wedge assemblies for movement thereof toward and away from each other by angular rotation of the shaft. Except as hereinafter noted, the wedge assemblies 12 and 14 are substantially mirror images of each other and identical in construction. Only the wedge assembly 12 is described in detail in the interest of brevity.

Parts in the wedge assembly 14 identical with like parts in the wedge assembly 12 are indicated by prime numerals.

The wedge assembly 12 is formed by a pair of rectangular panels 18 and 20 having a selected length greater than the width thereof in the example shown. Each panel has top and bottom ends 22-24 and opposing side edges 26-28.8. The panels 18 and 20 are disposed in angular relation defining respective planes converging toward the opposite wedge assembly. The angular position of each panel, with respect to the vertical, is selected in accordance with the radial dimension of the tires 9 and 10 to be secured. The panels 18 and 20 are shown planar but obviously may be arcuately curved between their ends 22-24 to at least partially conform to the encompassed arc of the tires 9 and 10 to increase the area of contact.

Figure 2:
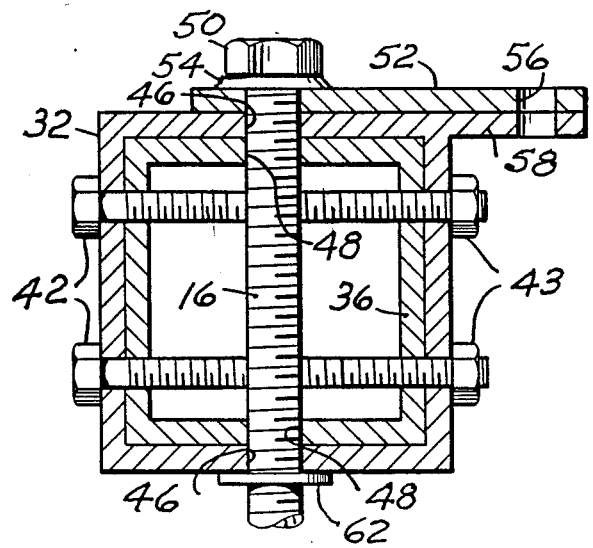
FIG. 2 is a fragmentary vertical cross sectional view, to a larger scale, taken substantially along the line 2—2 of FIG. 1; and, FIG. 3 is a perspective view of the device, per se, with parts broken away for clarity.
Figure 3:
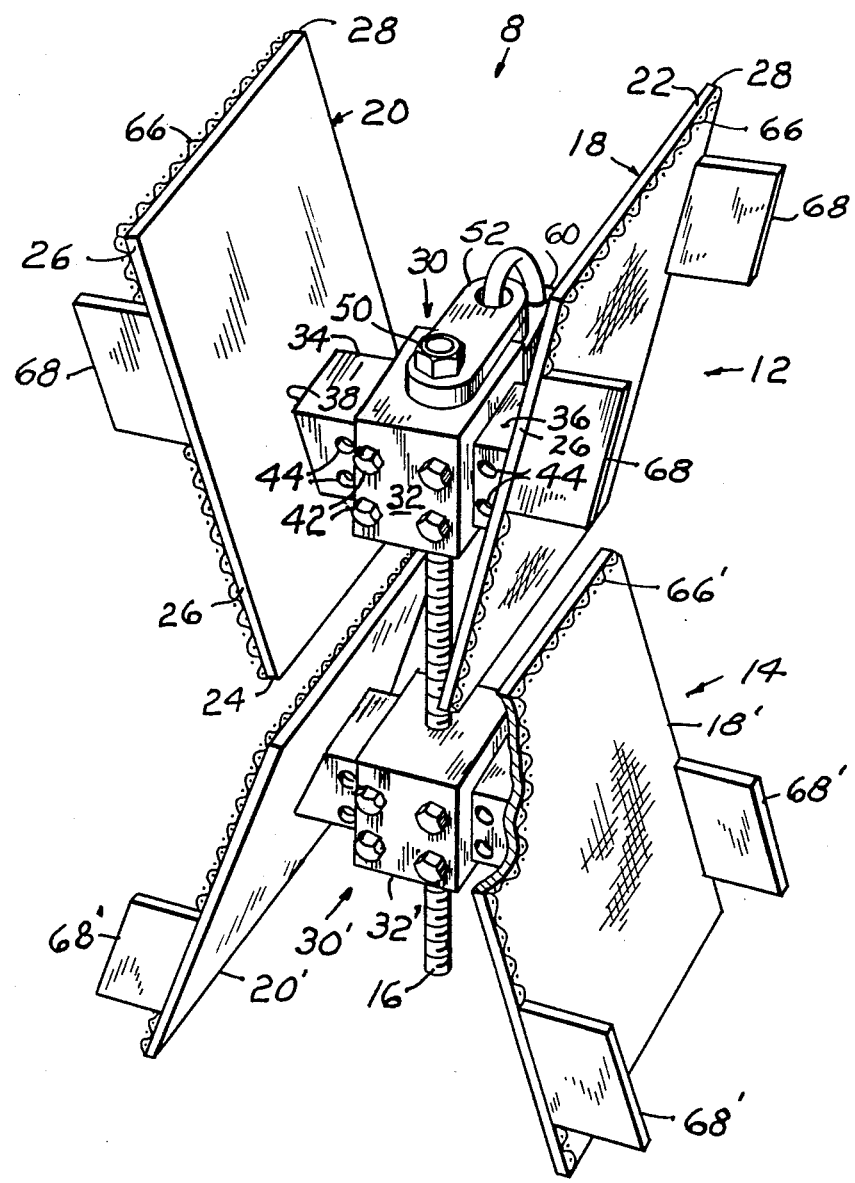

Telescoping means 30 extends horizontally between, as viewed in the drawings, and is rigidly connected at its respective ends with an intermediate portion of the confronting surfaces of the panels 18 and 20. The telescoping means 30 comprises an outer sleeve or tube 32, substantially square in transverse section (FIG. 2).

The open ends of the tube 32 respectively slidably receive, in longitudinal sliding relation, one end portion of inner tubes 34 and 36. The tube 34 has its outer end 38 rigidly secured to an intermediate surface of the panel 20 and the tube 36 is connected at its outer end 40 to the panel 18. Adjacent its open ends, the opposing vertical walls of the outer tube 32 are horizontally drilled in vertically spaced relation for receiving bolts 42 having lock nuts 43. The cooperating vertical walls of the inner tubes 34 and 36 are similarly drilled in horizontal longitudinally and vertically spaced rows of holes 44 cooperatively receiving the bolts 42 and maintaining the telescoping tubes in extended or telescoped relation.

The threaded shaft 16 is preferably case hardened to resist hacksawing and extends vertically through apertures 46 in the outer tube 32 and through upper and lower slots 48 longitudinally formed in the upper and lower limits of the respective inner tube end portions projecting into the outer tube 32. The top end of the shaft 16 is rigidly secured with a heavy duty nut 50 for receiving a ratchet wrench, not shown. An elongated generally rectangular tab 52 has one end portion apertured and surrounds the shaft 16 between the nut 50 and the top surface of the outer tube 32 and is secured, as by welding, indicated at 54. The opposite end portion of the tab being line drilled, as at 56, with a cooperating lug 58 rigidly connected with an adjacent edge of the top portion of the outer tube 32. The purpose of the line drilled holes 56 is to receive the shackle of a padlock 60 for preventing unauthorized angular rotation of the shaft 16. Longitudinal movement of the shaft 16 relative to the telescoping means or assembly 30 is prevented by a washer 62, or the like, surrounding and secured to the shaft 16 adjacent the lower or bottom limit of the outer tube 32, as by welding, or the like.

A nut 64 threadedly receiving the shaft 16 is similarly anchored to the bottom surface of the other telescoping assembly 30'.

The surface of each panel 18 and 20 opposite the respective telescoping assembly is preferably covered with screenlike material 66, such as expanded metal to provide a rough surface to increase the coefficient of sliding friction of a tire tread relative to the respective panel.

Additionally, each panel is preferably provided with flanges 68 generally rectangular in side elevation rigidly connected by one longitudinal edge normal to the plane of the respective panel and aligned with the respective lateral edge 26 and 28 of the panels 18 and 20. The purpose of the flanges is to project rearwardly or forwardly, respectively, on opposing edge portions of the respective tire and prevent movement of the locking assembly 8 in a direction parallel with the longitudinal axes of the axles mounting the tires and wheels 9 and 10.

OPERATION

In operation, the shaft 16 is angularly rotated in a direction to move the wedge assemblies 12 and 14 in opposing directions a distance sufficient to permit manually inserting the device 8, in a horizontal lateral direction between the tires 9 and 10, wherein the flanges 68 are disposed on opposing peripheral portions of the respective tire tread. Assuming, of course, that the telescoping means 30 has been adjusted for the spacing between the panels to accommodate the spacing between confronting circumferential portions of the tires and preferably centrally disposing the shaft 16 between the tires. The shaft 16 is then manually rotated in an opposite direction which draws the lowermost wedge assembly 14 upwardly toward the Q top wedge assembly 12 while the latter is supported by its panels 18 and 20 contacting the respective tire tread. A desired torque is placed on the shaft to insure positive gripping contact of the respective expanded metal 66 with the respective tire tread. The shaft is positioned so that its locking tab aperture 56 is in register with the mating bore in the lug 58 for receiving the lock 60. Obviously, the wedge members 12 and 14 are preferably positioned so that the locking lug 58 is disposed inwardly of the vehicle to at least make it inconvenient for any attempt to break the lock or the lug.

The device 8 is removed from the tandem tires by removing the lock and manually rotating the shaft 16 in a direction to lower the wedge assembly 14 which is forced downwardly relative to the top wedge assembly 12 by travel of the nut 64 along the shaft 16 so that the device may be manually removed from its position between the tires.

Obviously the invention is susceptible to changes or alterations without defeating its practicability. Therefore, I do not wish to be confined to the preferred embodiment shown in the drawings and described herein.

I claim:

1. An exterior braking assembly for tires mounted in tandem relation on a vehicle, comprising:
    upper and lower wedge assemblies dimensioned for wedging engagement with vertically spaced confronting circumferential portions of tire treads on said tires for prohibiting rotation of said tires,
        each said wedge assembly comprising a pair of panels disposed in fore to aft spaced relation with the planes defined by the panels converging toward the opposite wedge assembly, and
        telescopic members extending horizontally between and adjustably connecting the panels of the respective said wedge together,
        said telescoping members comprising, a plurality of tubular members,
        each tubular member of said plurality of tubular members having a wall and having a plurality of transverse apertures mating and mismating with selected cooperating apertures in the wall of an adjacent tubular member of said tubular members;
    fastening means extended through mated wall apertures for maintaining the panels of each said wedge assembly in selected horizontal spaced relationship;
    a threaded shaft extending vertically between said wedge assemblies in a manner for moving at least one wedge assembly toward and away from the other wedge assembly by angular rotation of the shaft; and,
    screen material secured to the surface of each said panel contacted by a tire tread for increasing the coefficient of sliding friction between the tire tread and the respective said panel.

* * * * *